(12) United States Patent
Ookura (10) Patent No.: US 11,435,718 B2
(45) Date of Patent: Sep. 6, 2022

(54) MACHINE CONTROLLER

(71) Applicant: FANUC CORPORATION, Yamanashi (JP)

(72) Inventor: Takuma Ookura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 282 days.

(21) Appl. No.: 16/814,310

(22) Filed: Mar. 10, 2020

(65) Prior Publication Data

US 2020/0310379 A1 Oct. 1, 2020

(30) Foreign Application Priority Data

Mar. 25, 2019 (JP) .............................. JP2019-056425

(51) Int. Cl.
*G05B 19/402* (2006.01)

(52) U.S. Cl.
CPC .. *G05B 19/402* (2013.01); *G05B 2219/35261* (2013.01); *G05B 2219/42204* (2013.01)

(58) Field of Classification Search
CPC ........ G05B 19/402; G05B 2219/35261; G05B 2219/42204
See application file for complete search history.

(56) References Cited

U.S. PATENT DOCUMENTS

| 4,575,666 | A * | 3/1986 | Nakashima | ........ | G05B 19/4062 |
| | | | | | 318/661 |
| 5,187,724 | A * | 2/1993 | Hibino | .................. | G05B 19/231 |
| | | | | | 377/17 |
| 2016/0259319 | A1* | 9/2016 | Haga | ..................... | G05B 19/401 |
| 2017/0052526 | A1* | 2/2017 | Yoshiura | ................ | H02K 11/21 |

FOREIGN PATENT DOCUMENTS

| JP | S62-154109 A | 7/1987 |
| JP | H03-006714 A | 1/1991 |
| JP | 2000099156 A | 4/2000 |

OTHER PUBLICATIONS

An Office Action; "Notice of Reasons for Refusal", mailed by the Japanese Patent Office dated Jun. 29, 2021, which corresponds to Japanese Patent Application No. 2019-056425 and is related to U.S. Appl. No. 16/814,310; with English language translation.

* cited by examiner

*Primary Examiner* — Kidest Bahta
(74) *Attorney, Agent, or Firm* — Studebaker & Brackett PC

(57) ABSTRACT

A machine controller for controlling a machine detects an absolute position of a detection target using a detector outputting rotation number data corresponding to a position of the detection target, and controls the machine based on the detected absolute position of the detection target. The machine controller includes: a storage unit which stores rotation number data, of the detector, that corresponds to a zero point position of the absolute position, as zero point position data, and which stores rotation number data exceeding a rotation number data length that the detector can output, as extended rotation number data; and a calculation unit which calculates the absolute position in accordance with Formula (1) below that is based on the rotation number data output from the detector, the zero point position data, and the extended rotation number data:

Absolute position=(Rotation number data from the detector+Extended rotation number data)−Zero point position data  (1).

6 Claims, 9 Drawing Sheets

MACHINE CONTROLLER

This application is based on and claims the benefit of priority from Japanese Patent Application No. 2019-056425, filed on 25 Mar. 2019, the content of which is incorporated herein by reference.

BACKGROUND OF THE INVENTION

Field of the Invention

The present disclosure relates to a controller for controlling a machine such as a machine tool or an industrial robot.

Related Art

A controller for controlling a machine tool or an industrial robot detects an absolute position of a detection target by using a detector which outputs rotation number data corresponding to a position of the detection target, and controls the machine based on the detected absolute position of the detection target (see, for example, Patent Document 1).
Patent Document 1: Japanese Unexamined Patent Application, Publication No. 2000-99156

SUMMARY OF THE INVENTION

Figure 8:
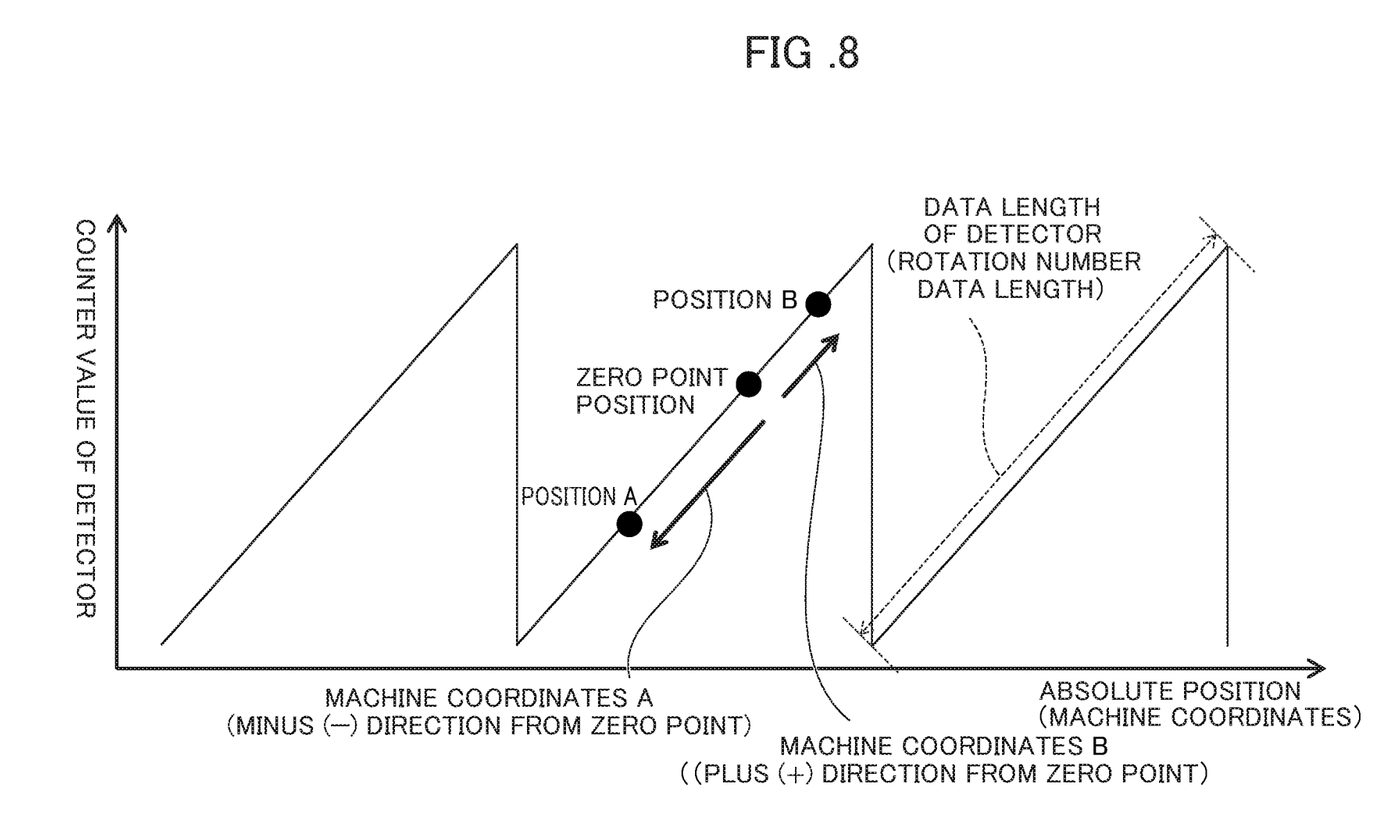
FIG. 8 shows a relationship between rotation number data of detector and an absolute position according to the known art.

As shown in FIG. 8, the detector for detecting an absolute position has a counter value (rotation number data and rotation number data within one rotation). The controller retains a counter value of the detector, the counter value corresponding to a zero point position of the absolute position. The controller calculates the absolute position (e.g., machine coordinates) from a difference between a counter value of the detector at a current position and the counter value of the detector at the zero point.

Figure 9:
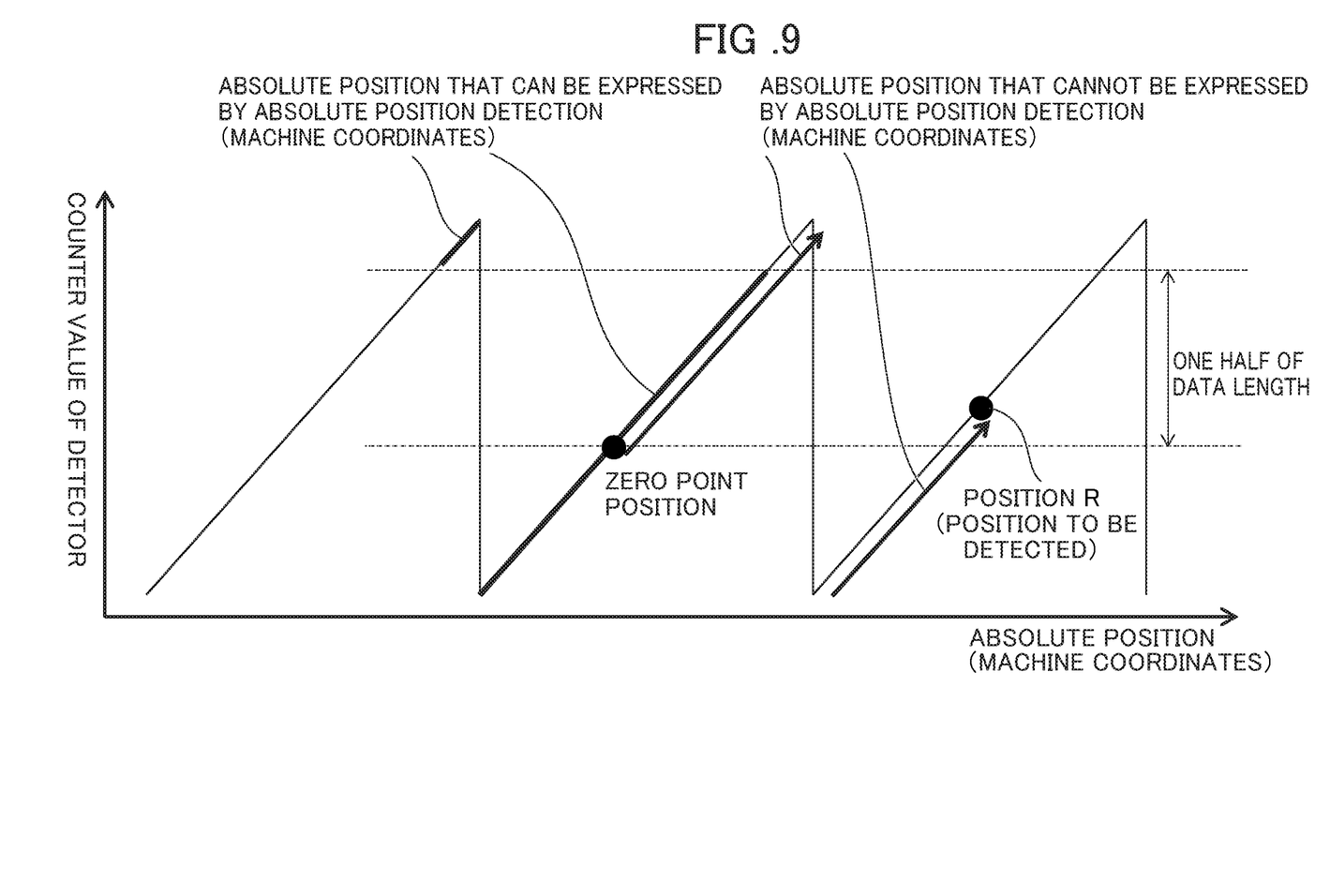
FIG. 9 shows a relationship between rotation number data of a detector and an absolute position according to the known art.

Data lengths (rotation number data lengths) of counter values of detectors vary from one type of detector to another. As shown in FIG. 9, if a detector has a small data length, an absolute position (e.g., machine coordinates) which can be expressed by absolute position detection is narrow, resulting in a limitation of applicable machines. In FIG. 9, the zero point position plus and minus one half of the data length is shown as the data length of the detector. Since a position exceeding the data length of the detector cannot be expressed by the detector, the accurate absolute position (e.g., machine coordinates) cannot be calculated.

In the field of machine control, there has been a demand for a technique by which an absolute position can be detected based on rotation number data output from a detector, irrespective of a data length of the detector.

According to an aspect of the present disclosure, a machine controller for controlling a machine detects an absolute position of a detection target, using a detector outputting rotation number data corresponding to a position of the detection target, and controls the machine based on the detected absolute position of the detection target. The machine controller includes: a storage unit which stores rotation number data, of the detector, that corresponds to a zero point position of the absolute position, as zero point position data, and which stores rotation number data exceeding a rotation number data length that the detector can output, as extended rotation number data; and a calculation unit which calculates the absolute position in accordance with Formula (1) below that is based on the rotation number data output from the detector, the zero point position data, and the extended rotation number data:

$$\text{Absolute position} = (\text{Rotation number data from the detector} + \text{Extended rotation number data}) - \text{Zero point position data} \quad (1)$$

According to another aspect of the present disclosure, a machine controller for controlling a machine detects an absolute position of a detection target using a detector outputting rotation number data corresponding to a position of the detection target, and controls the machine based on the detected absolute position of the detection target. The machine controller includes: a storage unit which stores rotation number data, of the detector, that corresponds to a zero point position of the absolute position, as zero point position data, and which stores shifted zero point position data resulting from shifting the zero point position data by an extended rotation number data, while rotation number data exceeding a rotation number data length that the detector can output is defined as the extended rotation number data; and a calculation unit which calculates the absolute position in accordance with Formula (2) below that is based on the rotation number data output from the detector and the shifted zero point position data:

$$\text{Absolute position} = \text{Rotation number data from the detector} - \text{Shifted zero point position data} = \text{Rotation number data from the detector} - (\text{Zero point position data} - \text{Extended rotation number data}) \quad (2).$$

The present disclosure makes it possible, in the field of machine control, to detect an absolute position based on rotation number data output from a detector, irrespective of a data length of the detector.

DETAILED DESCRIPTION OF THE INVENTION

Examples of embodiments of the present disclosure will be described below with reference to the accompanying drawings. In the drawings, the same or equivalent components or portions are denoted by the same reference character.

First Embodiment

Figure 1:
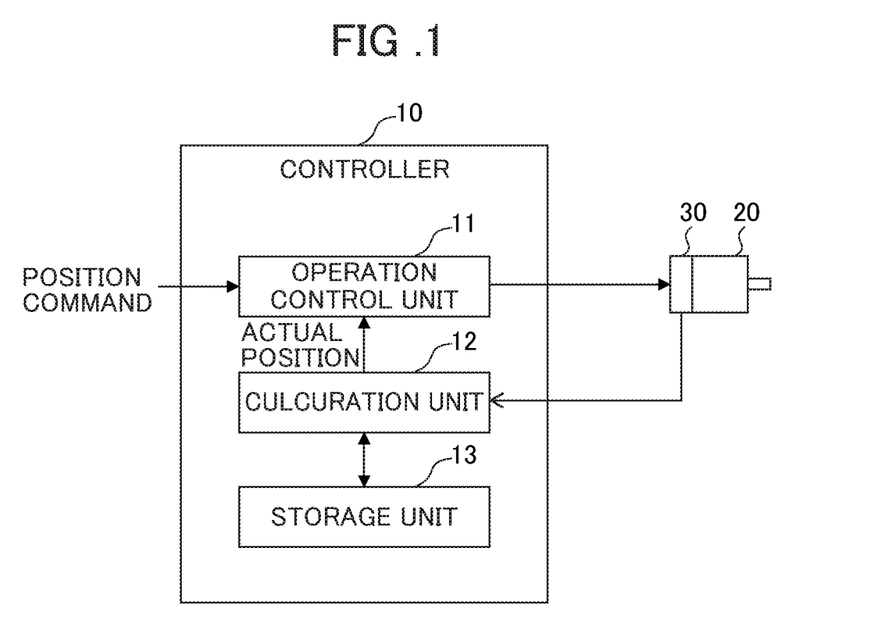
FIG. 1 is a diagram showing a configuration of a machine tool controller according to the present embodiment.

FIG. 1 shows a configuration of a machine tool controller according to a first embodiment. The controller 10 shown in FIG. 1 is a numerical controller that controls, for example, a ball screw of a machine tool so as to control a position of a control target on a table of the ball screw. The controller 10 detects a position (e.g., machine coordinates: an absolute position) of the control target by using a detector 30 such as an encoder attached to, for example, a motor 20 that drives the ball screw, and controls the motor 20 based on the detected position of the control target. Hereinafter, the control target may be referred to as the detection target.

The detector 30 is a rotation detector that outputs rotation number data corresponding to an actual position of the detection target. The detector 30 outputs the rotation number data and rotation number data within one rotation.

The controller 10 includes an operation control unit 11, a calculation unit 12, and a storage unit 13. The operation control unit 11 and the calculation unit 12 of the controller 10 are constituted by an arithmetic processor such as a digital signal processor (DSP) and a field-programmable gate array (FPGA). The functions of the operation control unit 11 and the calculation unit 12 of the controller 10 are implemented by, for example, execution of predetermined software (programs, applications) stored in the storage unit. The functions of the operation control unit 11 and the calculation unit 12 of the controller 10 may be implemented by cooperation of hardware and software. The storage unit 13 of the controller 10 is a rewritable memory such as EEPROM, or a rewritable disk such as a hard disk drive (HDD) or a solid state drive (SSD).

The operation control unit 11 controls the detection target in terms of position by controlling the motor 20 based on a position command (e.g., machine coordinates: an absolute position) designating a position of the detection target and an actual position (e.g., machine coordinates: an absolute position) of the detection target, the actual position provided from the calculation unit 12.

Figure 2:
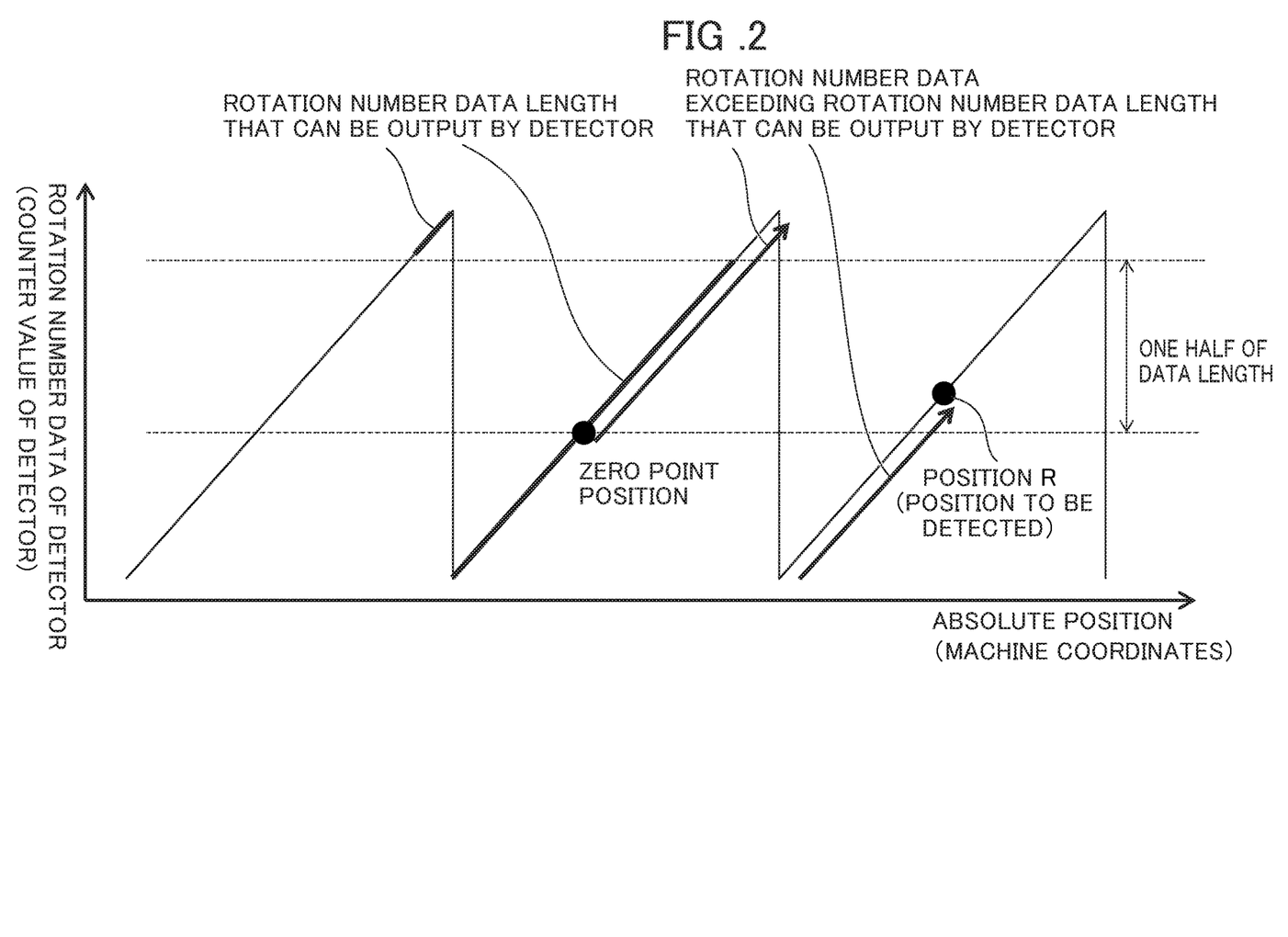
FIG. 2 shows a relationship between rotation number data of a detector and an absolute position according to a first embodiment.

As shown in FIG. 2, the storage unit 13 stores, as zero point position data, rotation number data, of the detector 30, that corresponds to the zero point position of an absolute position. The storage unit 13 also stores, as extended rotation number data, rotation number data exceeding the rotation number data length that the detector 30 can output. The extended rotation number data is defined, in a case where the detector 30 rolls over to exceed the rotation number data length, as a multiplication product of the number of counts of rollover and the rotation number data corresponding to the rotation number data length. Note that in FIG. 2, the zero point position plus and minus one half of the data length is shown as the data length of the detector.

The calculation unit 12 calculates an actual position (e.g., machine coordinates: an absolute position) of the detection target in accordance with Formula (1) below, which is based on the rotation number data (rotation number data within one rotation and rotation number data) output from the detector 30, and the zero point position data and the extended rotation number data that are stored in the storage unit 13.

$$\text{Absolute position (machine coordinates)} = (\text{Rotation number data from the detector} + \text{Extended rotation number data}) - \text{Zero point position data} \quad (1)$$

Specifically, the calculation unit 12 multiplies the calculated rotation number by amount of movement per rotation to determine the actual position (e.g., machine coordinates: an absolute position) of the detection target.

An example will be described below. This example is based on an assumption that the detector 30 retains rotation number data and rotation number data within one rotation, and the controller 10 retains the number of counts of rollover and rotation number data corresponding to a rotation number data length (i.e., extended rotation number data).

The capability of the detector 30 is as follows.
Rotation number data within one rotation=$2^{-21}$
Rotation number data=$2^{12}$
Thus, it is assumed that the detector 30 can detect a position within one rotation of the motor 20 with precision to 2,097,152 equal divisions, and can detect 4,096 rotations of the motor 20 at most.

The extended rotation number data stored by the controller 10 is as follows.
Extended rotation number data=$2^4$
Thus, it is assumed that the controller 10 can detect that 4,096 rotations corresponding to the rotation number data length of the detector 30 are repeated up to 16 times (16 times of rollover) (the rotation number data is extended to $2^{16}$.

The zero point position data stored by the controller 10 is as follows.
Rotation number data within one rotation=800
Rotation number data=8
Suppose that the current position of the motor is as follows.
Rotation number data within one rotation=33,536
Rotation number data=338
Number of Counts of Rollover=1
In this case, the number of rotations that the motor has made from the zero point position is determined by the calculation below.

$$(33{,}536-800) \times 2^{-21} + (338-8) + 1 \times 2^{12} \approx 4{,}426.016$$

Multiplying this rotation number by amount of movement per rotation determines an absolute position (e.g., machine coordinates).

$$\text{Absolute position (e.g., machine coordinates)} = \text{Rotation number} \times \text{Amount of movement per rotation}$$

In this example, with respect to the capability of the detector 30 (detectable of 4,096 rotations at most), the capability of detecting the absolute position is extended to 65,536 rotations at most.

Figure 3:
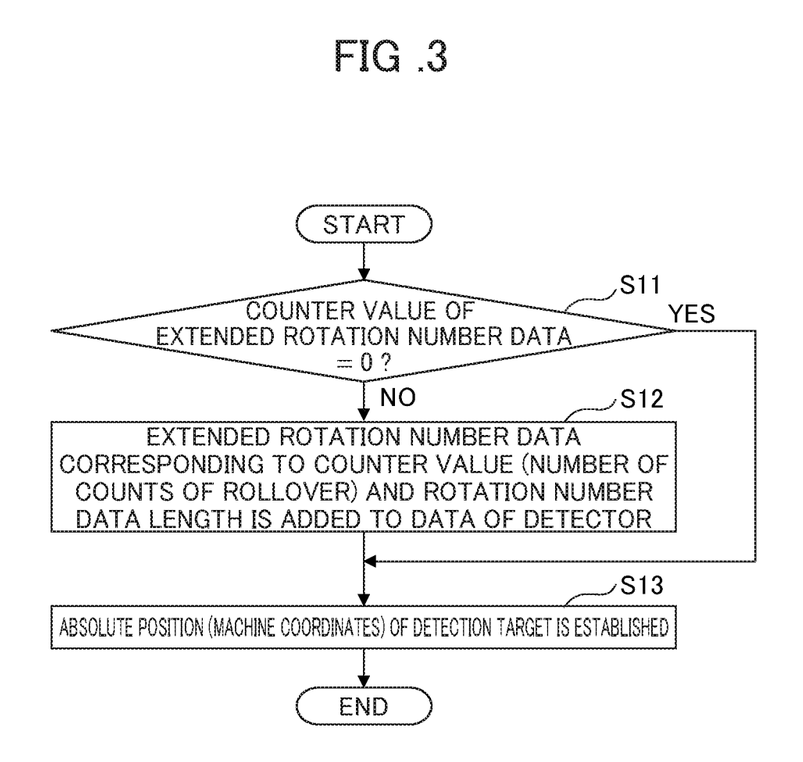
FIG. 3 is a flowchart showing an operation of detecting an absolute position, performed by a machine tool controller according to the first embodiment.
Figure 4:
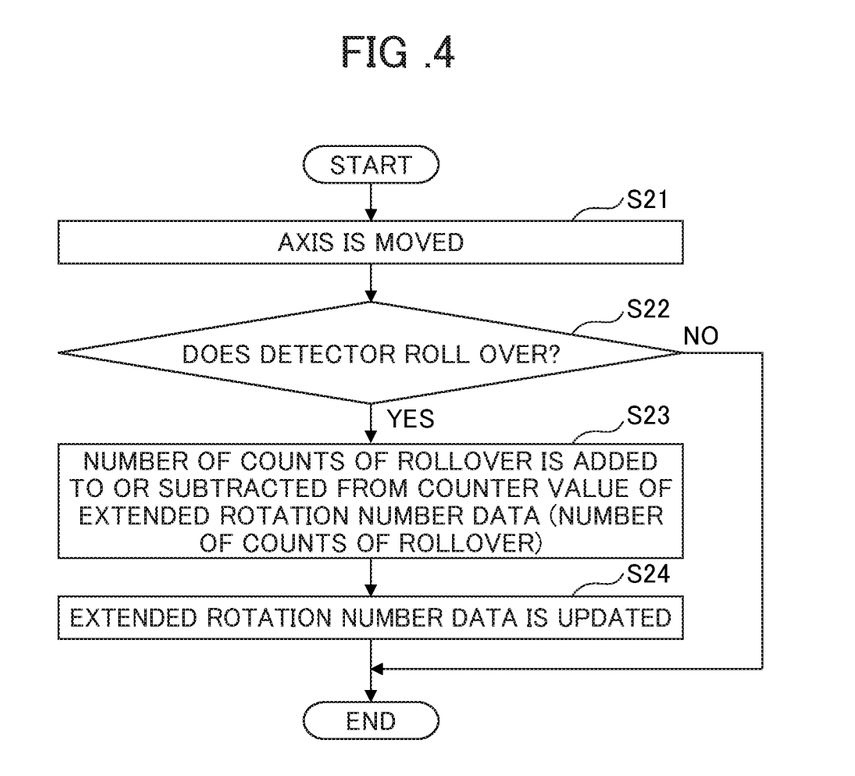
FIG. 4 is a flowchart showing an operation of updating extended rotation number data, performed by the machine tool controller according to the first embodiment.

Next, with reference to FIGS. 3 and 4, operations performed by the machine tool controller according to the present embodiment will be described. FIG. 3 is a flowchart showing an operation of detecting an absolute position, performed by the machine tool controller according to the present embodiment. FIG. 4 is a flowchart showing an operation of updating extended rotation number data, performed by the machine tool controller according to the present embodiment.

(Operation of Detecting Absolute Position)

As shown in FIG. 3, the controller 10 determines whether the counter value of the extended rotation number data (number of counts of rollover) is 0 (S11). If the counter value of the extended rotation number data (number of counts of rollover) is not 0, the calculation unit 12 of the controller 10 adds the extended rotation number data corresponding to the counter value (number of counts of rollover) and the rotation number data length, to the rotation number data from the detector 30 (S12), and then, calculates machine coordinates and establishes the machine coordinates (13). On the other hand, if the counter value of the extended rotation number data (number of counts of rollover) is 0, the calculation unit 12 of the controller 10 calculates an absolute position (machine coordinates) of the detection target from the rotation number data from the detector 30, and establishes the absolute position (machine coordinates) (S13).

(Operation of Updating Extended Rotation Number Data)

As shown in FIG. 4, the controller 10 moves an axis (S21), and detects whether the detector 30 rolls over (S22). If the detector 30 rolls over, the controller 10 adds or subtracts the number of counts of rollover to or from the counter value of the extended rotation number data (number of counts of rollover) (S23), and then updates the extended rotation number data stored in the storage unit 13 (S24). Updating the extended rotation number data of the controller 10 at the timing of the rollover of the detector 30 in this manner can reduce the processing load of the controller 10. On the other hand, if the detector 30 does not roll over, the operation ends.

As described above, the controller 10 according to the present embodiment stores, as the extended rotation number data, rotation number data exceeding the rotation number data length that the detector 30 can output, and calculates an absolute position (e.g., machine coordinates) of the detection target in accordance with Formula (1) above, in which the extended rotation number data is used in addition to the rotation number data output from the detector 30. As a result, the absolute position can be detected based on the rotation number data output from the detector 30, irrespective of the data length of the detector 30.

Thus, no limitation is imposed on the absolute position (e.g., machine coordinates) by the data length of the detector, and the absolute position (e.g., machine coordinates) can be expressed up to a data length matching amount of movement of a machine.

Second Embodiment

In the first embodiment, the rotation number data exceeding the rotation number data length that the detector 30 can output is stored as the extended rotation number data, and the extended rotation number data is used in addition to the rotation number data output from the detector 30, whereby an absolute position (e.g., machine coordinates) of the detection target is calculated. In a second embodiment, while rotation number data exceeding a rotation number data length that the detector 30 can output is defined as extended rotation number data, zero point position data is shifted by the extended rotation number data (resulting in shifted zero point position data). The rotation number data output from the detector 30 and the shifted zero point position data are used in the calculation of an absolute position (e.g., machine coordinates) of a detection target.

The configuration of the machine tool controller according to the second embodiment is the same as that of the machine tool controller according to the first embodiment shown in FIG. 1. The machine tool controller 10 of the second embodiment is the same as the machine tool controller 10 according to first embodiment shown in FIG. 1, except the operations and functions carried out by the calculation unit 12 and the data stored in the storage unit 13.

Figure 5:
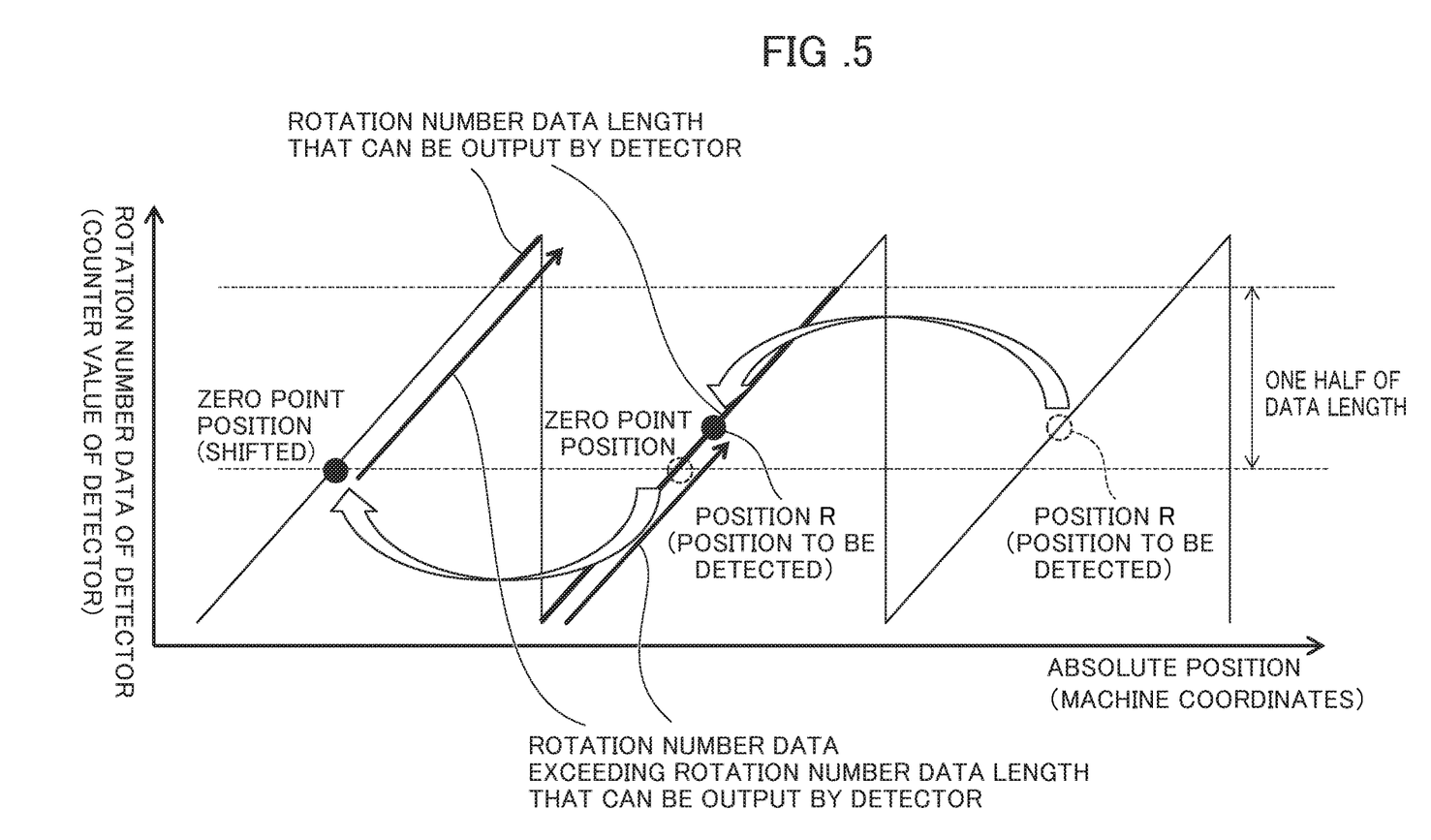
FIG. 5 shows a relationship between rotation number data of a detector and an absolute position according to a second embodiment.

As shown in FIG. 5, the storage unit 13 stores, as zero point position data, rotation number data, of the detector 30, that corresponds to a zero point position of an absolute position. While rotation number data exceeding a rotation number data length that the detector 30 can output is defined as the extended rotation number data, the storage unit 13 stores shifted zero point position data resulting from shifting the zero point position data by the extended rotation number data. As described earlier, the extended rotation number data is defined, in the case where the detector 30 rolls over to exceed the rotation number data length, as a multiplication product of the number of counts of rollover and the rotation number data corresponding to the rotation number data length. Note that also in FIG. 5, the zero point position plus and minus one half of the data length is shown as the data length of the detector.

The calculation unit 12 calculates an actual position (e.g., machine coordinates: an absolute position) of the detection target in accordance with Formula (2) below, which is based on the rotation number data (rotation number data within one rotation and rotation number data) output from the detector 30, and the shifted zero point position data stored in the storage unit 13.

Absolute position (e.g., machine coordinates)=Rotation number data from the detector−Shifted zero point position data=Rotation number data from the detector−(Zero point position data−Extended rotation number data) (2)

Specifically, the calculation unit 12 multiplies the calculated rotation number by amount of movement per rotation to determine an actual position (e.g., machine coordinates: an absolute position) of the detection target.

An example will be described below. This example is based on an assumption that the detector 30 retains rotation number data and rotation number data within one rotation.

The capability of the detector 30 is as follows.
Rotation number data within one rotation=$2^{21}$
Rotation number data=$2^{12}$
Thus, it is assumed that the detector 30 can detect a position within one rotation of the motor 20 with precision to 2,097,152 equal divisions, and can detect 4,096 rotations of the motor 20 at most.

The zero point position data stored by the controller 10 is as follows.
Rotation number data within one rotation=800
Rotation number data=8
If the detector 30 rolls over to exceed the rotation number data length, the controller 10 shifts the zero point position data by a multiplication product of the number of counts of rollover and the rotation number data corresponding to the rotation number data length (whereby the shifted zero point position data is produced).

Suppose that the current position of the motor is as follows.
Rotation number data within one rotation=33,536
Rotation number data=338
Number of Counts of Rollover=1
The zero point position data is shifted as indicated below (whereby the shifted zero point position data is produced).
Rotation number data within one rotation=800
Rotation number data=$8-(N \times 2^{12})$
(Since the rollover has taken place in a plus (+) direction, the zero point position is shifted in a minus (−) direction.) In this case, the number of rotations that the motor has made from the zero point position is determined as calculated below.

$$(33{,}536-800) \times 2^{-21}+(338-(8-(1 \times 2^{12}))) \approx 4{,}426.016$$

Multiplying this rotation number by amount of movement per rotation determines an absolute position (e.g., machine coordinates).

Absolute position (e.g., machine coordinates)=Rotation number×Amount of movement per rotation Also in this example, with respect to the capability of the detector 30 (detectable of 4,096 rotations at most), the capability of detecting the absolute position is extended to 65,536 rotations at most.

Figure 6:
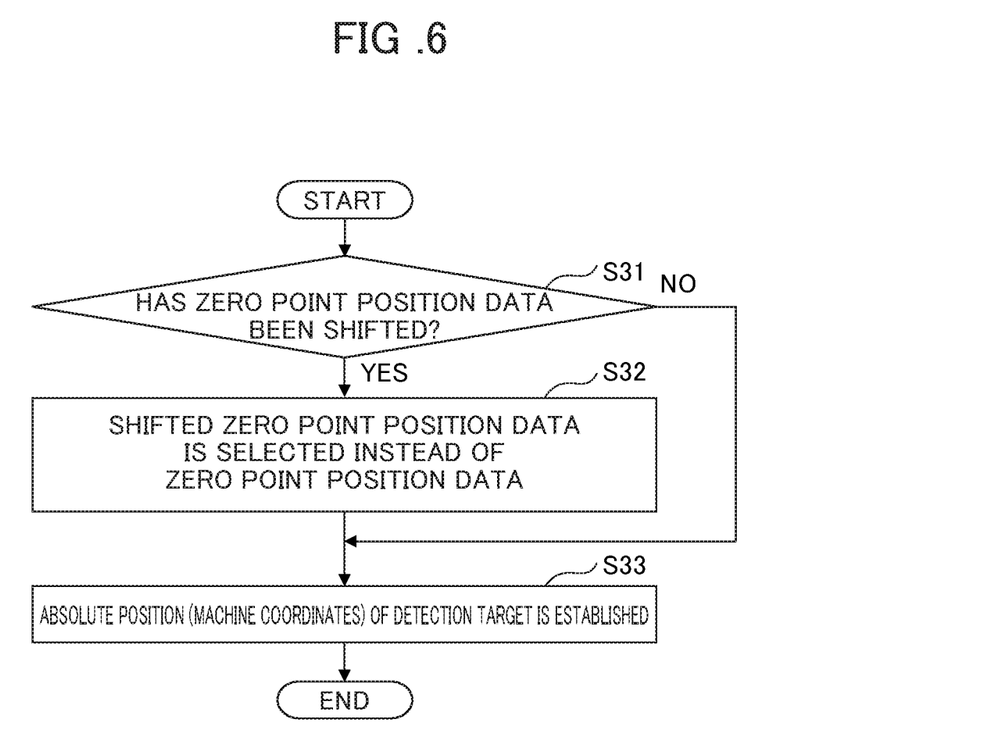
FIG. 6 is a flowchart showing an operation of detecting an absolute position, performed by a machine tool controller according to the second embodiment.
Figure 7:
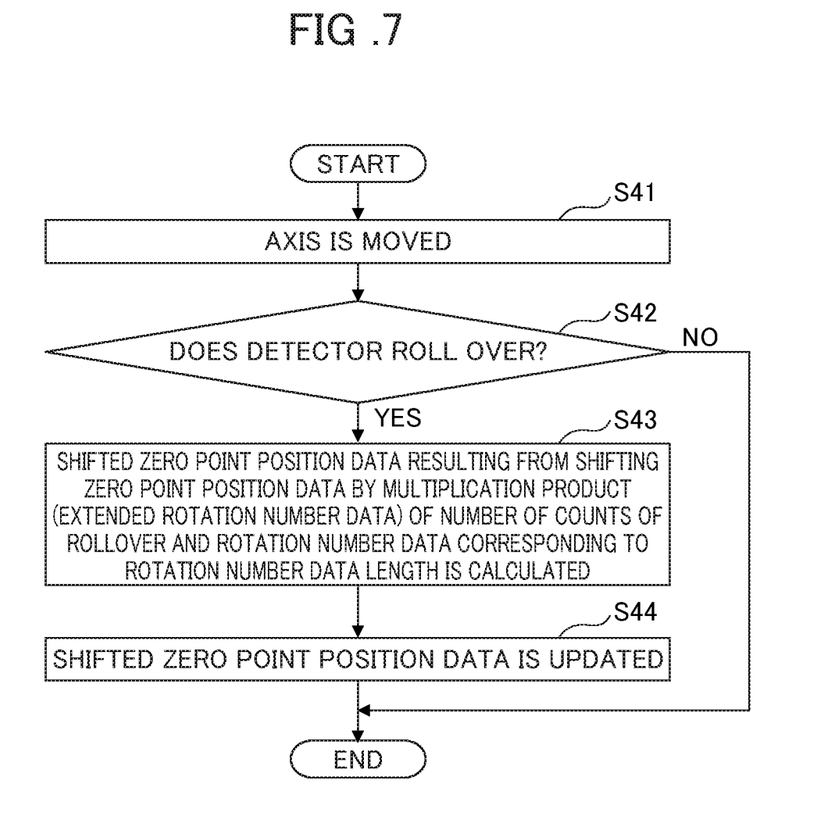
FIG. 7 is a flowchart showing an operation of updating shifted zero point position data, performed by the machine tool controller according to the second embodiment.

Next, with reference to FIGS. 6 and 7, operations performed by the machine tool controller of the present embodiment will be described. FIG. 6 is a flowchart showing an operation of detecting an absolute position, performed by the machine tool controller according to the present embodiment. FIG. 7 is a flowchart showing an operation of updating the shifted zero point position data, performed by the machine tool controller according to the present embodiment.

(Operation of Detecting Absolute Position)

As shown in FIG. 6, the controller 10 determines whether the zero point position data has been shifted (S31). If the zero point position data has been shifted, the calculation unit 12 of the controller 10 selects the shifted zero point position data instead of the zero point position data (S32), calculates machine coordinates of the detection target based on the rotation number data from the detector 30 and the shifted zero point position data, and establishes the machine coordinates. On the other hand, if the zero point position data has not been shifted, the calculation unit 12 of the controller 10 calculates an absolute position (machine coordinates) of the detection target based on the rotation number data from the detector 30 and the zero point position data, and establishes the absolute position (S33).

(Operation of Updating Shifted Zero Point Position Data)

As shown in FIG. 7, the controller 10 moves an axis (S41), and detects whether the detector 30 rolls over (S42). If the detector 30 rolls over, the controller 10 calculates the shifted zero point position data resulting from shifting the zero point position data by a multiplication product (the extended rotation number data) of the number of counts of rollover and the rotation number data corresponding to the rotation number data length (S43), and thereby updates the shifted zero point position data stored in the storage unit 13 (S44). Updating the shifted zero point position data of the controller 10 at the timing of the rollover of the detector 30 in this manner can reduce the processing load of the controller 10. On the other hand, the detector 30 does not roll over, the operations ends.

As described above, in the case where the rotation number data exceeding the rotation number data length that the detector 30 can output is defined as the extended rotation number data, the controller 10 according to the present embodiment shifts the zero point position data by the extended rotation number data (so as to produce the shifted zero point position data), and calculates an absolute position of the detection target in accordance with Formula (2) above in which the rotation number data output from the detector 30 and the shifted zero point position data are used. As a result, even though the rotation number data exceeding the rotation number data length that the detector 30 can output is not retained as the extended rotation number data, an absolute position can be detected based on the rotation number data output from the detector 30, irrespective of the data length of the detector 30.

The embodiments of the present disclosure have been described in the foregoing. It should be noted that the present disclosure is not limited to the embodiments described above, and various changes and modification can be made to the present disclosure. For example, in the above embodiments, the controller for controlling a machine tool has been exemplified. However, the present disclosure is not limited to the control of a machine tool, but is applicable as controllers for controlling various machines such as an industrial robot.

Further, in the above embodiments, the control target is the same as the detection target, and each of the machine controllers exemplified in the above embodiments controls a position of the control target based on a position of the detection target. However, the present disclosure is not limited thereto, but is applicable as a machine controller in which the control target is different from the detection target, and which controls a position of the control target based on a position of the detection target. For example, the present disclosure is applicable to an industrial robot controller which controls a relative position between a tool or workpiece (control target) attached to a distal end of an arm of an industrial robot and a workpiece or tool (detection target) arranged fixedly.

EXPLANATION OF REFERENCE NUMERALS

10 Machine Controller
11 Operation Control Unit
12 Calculation Unit
13 Storage Unit
20 Motor
30 Detector

What is claimed is:

1. A machine controller for controlling a machine, the machine controller detecting an absolute position of a detection target using a detector that outputs rotation number data corresponding to a position of the detection target, and controlling the machine based on the detected absolute position of the detection target, the machine controller comprising:

a storage unit which stores rotation number data, of the detector, that corresponds to a zero point position of the absolute position, as zero point position data, and which stores rotation number data exceeding a rotation number data length that the detector can output, as extended rotation number data; and a calculation unit which calculates the absolute position in accordance with formula (1) below that is based on the rotation number data output from the detector, the zero point position data, and the extended rotation number data:

Absolute position=(Rotation number data from the detector+Extended rotation number data)−Zero point position data (1).

2. The machine controller according to claim 1, wherein if the detector rolls over to exceed the rotation number data length, the extended rotation number data is a multiplication product of the number of counts of rollover and the rotation number data corresponding to the rotation number data length.

3. The machine controller according to claim 2, wherein the storage unit updates the extended rotation number data when the detector rolls over.

4. A machine controller for controlling a machine, the machine controller detecting an absolute position of a detection target using a detector that outputs rotation number data corresponding to a position of the detection target, and controlling the machine based on the detected absolute position of the detection target, the machine controller comprising:

a storage unit which stores rotation number data, of the detector, that corresponds to a zero point position of the absolute position, as zero point position data, and which stores shifted zero point position data resulting from shifting the zero point position data by an extended rotation number data, while rotation number data exceeding a rotation number data length that the detector can output is defined as the extended rotation number data; and a calculation unit which calculates the absolute position in accordance with formula (2) below that is based on the rotation number data output from the detector and the shifted zero point position data:

$$\text{Absolute position} = \text{Rotation number data from the detector} - \text{Shifted zero point position data} = \text{Rotation number data from the detector} - (\text{Zero point position data} - \text{Extended rotation number data}) \quad (2).$$

5. The machine controller according to claim 4, wherein if the detector rolls over to exceed the rotation number data length, the extended rotation number data is a multiplication product of the number of counts of rollover and the rotation number data corresponding to the rotation number data length.

6. The machine controller according to claim 5, wherein the storage unit shifts the zero point position data when the detector rolls over.

* * * * *